United States Patent [19]

Donald

[11] Patent Number: 4,696,750

[45] Date of Patent: Sep. 29, 1987

[54] FLOCCULATION OF PARTICLES BY POLYMERS THAT PRECIPITATE OUT OF SOLUTION

[75] Inventor: Jay Donald, Summit, N.J.

[73] Assignee: Exxon Research and Engineering Company, Florham Park, N.J.

[21] Appl. No.: 812,517

[22] Filed: Dec. 23, 1985

[51] Int. Cl.$^4$ .............................................. B01D 21/00
[52] U.S. Cl. .................................. 210/727; 23/313 R; 208/424; 208/426; 209/5; 210/728; 210/732; 210/735
[58] Field of Search ............. 23/313 R; 208/179, 180, 208/424, 426; 209/5; 210/725, 727, 728, 732, 735; 502/22, 24

[56] References Cited

U.S. PATENT DOCUMENTS

| | | | |
|---|---|---|---|
| 3,009,873 | 11/1961 | Kerr | 210/732 |
| 3,526,585 | 9/1970 | Camp | 210/634 |
| 3,563,885 | 2/1971 | Talbot | 208/180 |
| 3,642,728 | 2/1972 | Canter | 525/341 |
| 3,836,511 | 9/1974 | O'Farrell | 524/344 |
| 3,870,841 | 3/1975 | Makowski et al. | 524/132 |
| 4,138,224 | 2/1979 | Gorin | 208/426 |
| 4,256,571 | 3/1981 | Somasundaran et al. | 209/5 |
| 4,304,702 | 12/1981 | Makowski et al. | 525/344 |
| 4,507,486 | 11/1977 | Meadus et al. | 208/426 |
| 4,511,479 | 4/1985 | Fuller et al. | 210/708 |

FOREIGN PATENT DOCUMENTS 52-6727  2/1977  Japan .................................. 208/181

*Primary Examiner*—Peter Hruskoci
*Attorney, Agent, or Firm*—Richard E. Nanfeldt

[57] ABSTRACT

A process for flocculating solid fines from a solution comprising said solid fines and an organic liquid which comprises the steps of: (a) adding with mixing about 100 to about 500 ppm of an unneutralized or neutralized sulfonated polystyrene to said solution of solid fines; and (b) adding with mixing about 5 to about 25 weight percent of an antisolvent to the mixture of the sulfonated polystyrene and said solution of said solid fines.

4 Claims, No Drawings

FLOCCULATION OF PARTICLES BY POLYMERS THAT PRECIPITATE OUT OF SOLUTION

BACKGROUND OF THE INVENTION

In many industrial processes it is desirable to separate a finely dispersed phase from the liquid in which it is dispersed. The ease of this separation can be enhanced if the fine particles flocculate to form large aggregates. This flocculation can be made to occur by employing a polymeric additive that initially dissolves or disperses in the liquid, but then precipitates from solution while interacting with the particulates. Precipitation of the polymer can be induced by chemical or physical factors in the environment in which the polymer is dissolved or dispersed. Flocculation of particles results when the polymer coated particles collide. Thus, the physical or chemical factors in the environment need not be changed for the polymer to precipitate.

The present invention teaches that in a flocculation process of coke fines and catalyst fines from a solution by the use of a flocculating agent which is polystyrene or an unneutralized or neutralized sulfonated polystyrene, the flocculation process is improved by the addition of an antisolvent. The sulfonated polystyrene interacts with the catalyst fines or coke fines and a precipitate is formed of the sulfonated polystyrene and catalyst fines or coke fines upon the addition of an antisolvent. Flocculation of other fines, such as synthetic fuels, shale and coal fines, can be promoted by the use of the sulfonated polystyrene as a flocculating agent.

SUMMARY OF THE INVENTION

The present invention relates to a process for promoting the precipitation of solid fines out of a liquid medium. The process comprises the step of adding to a liquid containing solid fines a polystyrene or an unneutralized or neutralized sulfonated polystyrene and the simultaneous or subsequent addition of an antisolvent which causes the precipitation out of the liquid of the solid fine and sulfonated polymer. The unneutralized or neutralized sulfonated polymer interacts with the solid fines by adsorption of the sulfonated polymer onto the surface of the solid fines. The solid fines collide to form agglomerates which precipitate out of the solution upon the addition of the antisolvent.

GENERAL DESCRIPTION OF THE INVENTION

The present invention relates to a process for promoting the precipitation of solid fines out of a liquid medium. The process comprises the step of adding to a liquid containing solid fines a polystyrene or an unneutralized or neutralized sulfonated polystyrene and the simultaneous or subsequent addition of an antisolvent which causes the precipitation out of the liquid of the solid fine and sulfonated polymer. The unneutralized or neutralized sulfonated polymer interacts with the solid fines by adsorption of the sulfonated polymer onto the surface of the solid fines. The solid fines collide to form agglomerates which precipitate out of the solution upon the addition of the antisolvent.

The solid fines are selected from the group consisting of coke fines, catalyst fines, synthetic fuel fines, coal fines and shale fines. The water insoluble, oil soluble unneutralized or neutralized sulfonated polymers will comprise from about 5 to about 200 meg. pendant sulfonate groups per 100 grams of polymer, more preferably from 10 to 100 meg. pendant sulfonate groups. The sulfonated polymers utilized in the instant invention are either unneutralized or neutralized with the basic materials selected from Groups IA, IIA, IB and IIB of the Periodic Table of Elements and lead, tin and antimony, as well as ammonium and amine counterions. Sulfonated polymers which are subject to the process of the instant invention are illimitable and are plastic polymers. Specific polymers include sulfonated polystyrene, sulfonated t-butyl styrene, sulfonated ethylene copolymers and sulfonated propylene copolymers. The preferred polymers of the instant invention are sulfonated polystyrenes or unsulfonated polystyrene having a molecular weight as measured by GPC of about 1,000 to about 10,000,000.

Neutralization of the cited sulfonated polymers with appropriate metal hydroxides, metal acetates, metal oxides, amines or ammonium hydroxide, etc. can be conducted by means well-known in the art. For example, the sulfonation process of polystyrene can be conducted in a suitable solvent, such as toluene, with acetyl sulfate as the sulfonated agent, such as described in U.S. Pat. No. 3,836,511. The resulting sulfonic acid derivative can be employed as the flocculating agent or the sulfonic acid derivative can then be neutralized with a number of different neutralization agents, such as n-amine, sodium phenolate and similar metal salts. The amounts of such neutralization agents employed will normally be equal stoichiometrically to the amount of free acid in the polymer, plus any unreacted reagent which is still present. It is preferred that the amount of neutralizing agent be equal to the molar amount of sulfonating agent originally employed, plus 10% more to ensure full neutralization. The use of more of such neutralization agent is not critical. Sufficient neutralization agent is necessary to effect a least 50% neutralization of the sulfonic acid groups present in the polymer, preferably at least 90%, and most preferably essentially complete neutralization of such acid groups should be effected.

The degree of neutralization of said sulfonate groups may vary from 0 (free acid form) to 100 mole percent.

The amines employed as neutralizing agents in the instant invention are selected from the group consisting of primary, secondary and tertiary amines, wherein the amines have about 1 to about 30 carbon atoms.

The sulfonated polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

The preferred sulfonate for use in the instant invention, e.g., sulfonated polystyrene and substituted derivatives thereof, may be prepared by the procedures described in U.S. Pat. No. 3,870,841, filed Oct. 2, 1972 in the names of H. S. Makowski, R. D. Lundberg and G. H. Singhal, hereby incorporated by reference.

The water insoluble, sulfonated polymers are dissolved in an organic liquid at a level of from 0.01 to 20.0 weight percent and more preferably from 0.1 to 3.0 weight percent. The solution of sulfonated polymer in the organic liquid is added to the solution of the solid fines wherein about 5 to about 10,000 ppm of the sulfonated polystyrene is being added to the solution of the solid fines, more preferably about 25 to about 2,000, and most preferably about 100 to about 500.

The antisolvent is selected from the group consisting of organic materials that are liquid at process conditions. Preferably, these will be aliphatic hydrocarbons having about 7 to 30 carbon atoms, such as heptane, decane and hexadecane. To the mixture of the solution of the solid fines and the unneutralized or neutralized sulfonated polymer is added about 5 to about 25 weight percent of the antisolvent based upon the weight of the solution of the solid fines.

The sulfonated polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure.

The neutralized polymer may then be isolated by means well-known to those skilled in the art, i.e., coagulation, steam stripping or solvent evaporation, because the neutralized polymer has sufficient thermal stability to be dried for employment at a later time in the process of the instant invention.

It is also possible to neutralize the acid form of these polymers in situ, however, this is not a preferred operation since in situ neutralization requires preparation of the sulfonic acid in the organic liquid which is to be subjected to the instant process, or the acid form of the sulfonated polymer must be dissolved in said organic liquid.

Suitable polystyrene polymers useful in forming the sulfonated polystyrene polymers have an $\overline{M}_n$ as measured by GPC of about 10,000 to about 500,000, more preferably about 20,000 to about 200,000, and most preferably about 50,000 to about 200,000.

Suitable organic liquids for forming the solution of the unneutralized or neutralized sulfonated polymer are aromatic hydrocarbons, such as benzene, toluene, catalytic cracker bottoms, steam cracker tars and lube oil extracts.

The process of the instant invention for the flocculation of the solid fines from a solution of the solid fines comprises the steps of adding with mixing about 100 to about 500 ppm of an unneutralized or neutralized sulfonated polystyrene to the solution of the solid fines, adding about 5 to about 25 weight percent of an antisolvent to cause the precipitation of the solid fines from the solution. The organic liquid remaining after precipitation occurs is crystal clear.

DESCRIPTION OF THE PREFERRED EMBODIMENTS

The following Examples illustrate the present invention without, however, limiting the same hereto.

EXAMPLE 1

Preparation of Amine Salts of a Water Soluble Sulfonated Polystyrene

An aqueous solution (184.2 g) of a fully sulfonated polystyrene containing 55.3 g polymer was stirred with 0.3 mole of an organic amine, wherein the sulfonated polystyrene was prepared according to the procedure of U.S. Pat. No. 3,642,728, herein incorporated by reference. Water insoluble amine salts were steam stripped and vacuum dried. Water soluble amine salts were isolated by evaporation of the water and vacuum dried.

Preparation of Salts of Organic Soluble Sulfonated Polystyrene 0.1 mole of amine was dissolved in toluene or methyl chloride containing 20-25% of methanol. 55 g of 21% sulfonated polystyrene was added and stirring continued until polymer solution was complete. Solutions were steam stripped, washed with water in a high speed blender and dried, either in vacuum at 50° C. or in a fluidized bed drier at 100° C.

EXAMPLE 2

One percent by weight Avon coke fines 1-20 microns in diameter were dispersed in 1 gram of toluene. Three-hundred ppm polystyrene dissolved in toluene was then added and mixed in. A control prepared in the same manner without polystyrene addition exhibited the same gradual clarification upon standing as did the polystyrene containing system. This indicated that the polystyrene was not sterically stabilizing the coke fines. However, when 2 grams of normal heptane was shaken into both the polymer containing system and the control a dramatic difference in behavior occurred. The coke fines in the polymer containing system rapidly flocculated and fell in less than 1 minute to the bottom of the container. The control after 15 minutes did not have the clarity that the polymer containing system had after 1 minute.

EXAMPLE 3

This Example shows how a polymer that is dissolved in a good solvent can flocculate particles in a liquid if the liquid is miscible with the good solvent but is an antisolvent for the polymer.

One percent by weight Avon coke fines were dispersed in 1 gram of normal heptane. Two drops of a 1% solution of polystyrene in heptane were added to the heptane and the mixture was shaken for 10 seconds. The coke particles formed large flocs which fell rapidly to the bottom of the container.

EXAMPLE 4

This Example shows how a polymer can be used to flocculate particles if the polymer is dissolved in the particle containing liquid at one temperature and comes out of solution at another temperature.

One percent by weight Avon coke fines were dispersed in 1 gram of toluene and 300 ppm of 8 mole percent sulfonated polystyrene was added at 50° C. as a 1% solution in toluene. No flocculation was observed at this temperature. Cooling the system to 25° C. precipitated the polymer and caused extensive flocculation of coke fines.

What is claimed is:

1. A process for flocculating solid fines selected from the group consisting of coke fines, catalyst fines, synthetic fuel fines, coal fines, and shale fines from a solution comprising said solid fines and an organic liquid which comprises the steps of:
   (a) adding with mixing about 100 to about 500 ppm of a water insoluble unneutralized or neutralized sulfonated polystyrene to said solution of solid fines, wherein said sulfonated polystyrene is dissolved in a dissolving organic liquid at a concentration level of about 0.01 to about 20 weight percent and has from about 5 to about 200 meq. pendant sulfonate groups per 100 grams of polymer, and wherein said sulfonated polystyrene is absorbed on the surface of said solid fines; and (b) adding with mixing about 5 to about 25 weight percent of an antisolvent to the mixture of the sulfonated polystyrene and said solution of said solid fines wherein said antisolvent is an aliphatic hydrocarbon having about 7 to 30 carbon atoms, and wherein said solid fines collide to form agglomerates which precipitate out of said solution.

2. A process according to claim 1 wherein said unneutralized or neutralized sulfonated polystyrene is dissolved in an aromatic hydrocarbon.

3. A process according to claim 2 wherein said sulfonated polymer has from 10 to 100 meg. pendant sulfonate groups per 100 grams of the polymer.

4. A process according to claim 3 wherein said sulfonate groups are neutralized with a metal counterion or an amine.

* * * * *

UNITED STATES PATENT AND TRADEMARK OFFICE
CERTIFICATE OF CORRECTION

PATENT NO. : 4,696,750

DATED : September 29, 1987

INVENTOR(S) : Donald Jay Mintz

It is certified that error appears in the above-identified patent and that said Letters Patent is hereby corrected as shown below:

On the Title Page, Item [75] Inventor:

Inventor Name delete "Jay Donald" - insert -- Donald Jay Mintz -- thereof

Signed and Sealed this

Twenty-second Day of March, 1988

Attest:

DONALD J. QUIGG

*Attesting Officer*  *Commissioner of Patents and Trademarks*